United States Patent [19]

Guidry

[11] 4,124,236
[45] Nov. 7, 1978

[54] COUPLING FOR HELICALLY CORRUGATED SPIRAL PIPE

[76] Inventor: Kirby J. Guidry, P.O. Box 14386, Baton Rouge, La. 70808

[21] Appl. No.: 760,702

[22] Filed: Jan. 19, 1977

[51] Int. Cl.² ............................................. F16L 17/04
[52] U.S. Cl. .................... 285/373; 285/424; 285/DIG. 4
[58] Field of Search .......... 285/407, 408, 409, 410, 285/373, 419, 424, DIG. 4, 177, 176, 364, 365, 366, 367, 420; 24/279; 277/167, 200, 203, 213

[56] References Cited

U.S. PATENT DOCUMENTS

| 1,197,813 | 9/1916 | Frilick | 285/410 X |
| 3,315,991 | 4/1967 | Davis | 285/424 X |
| 3,708,187 | 1/1973 | Campbell | 285/DIG. 4 |

FOREIGN PATENT DOCUMENTS

| 102,093 | 8/1922 | Switzerland | 285/365 |
| 465,724 | 5/1937 | United Kingdom | 285/367 |

*Primary Examiner*—Dave W. Arola
*Attorney, Agent, or Firm*—Roy, Kiesel, Patterson & Abadie

[57] ABSTRACT

A coupling for providing a substantially soil tight joint between abutting ends of helically corrugated spiral pipe having a pair of corrugated flexible preformed strips, one located on and encircling each pipe, and a metal tightening band fitted over the outside of both strips.

3 Claims, 6 Drawing Figures

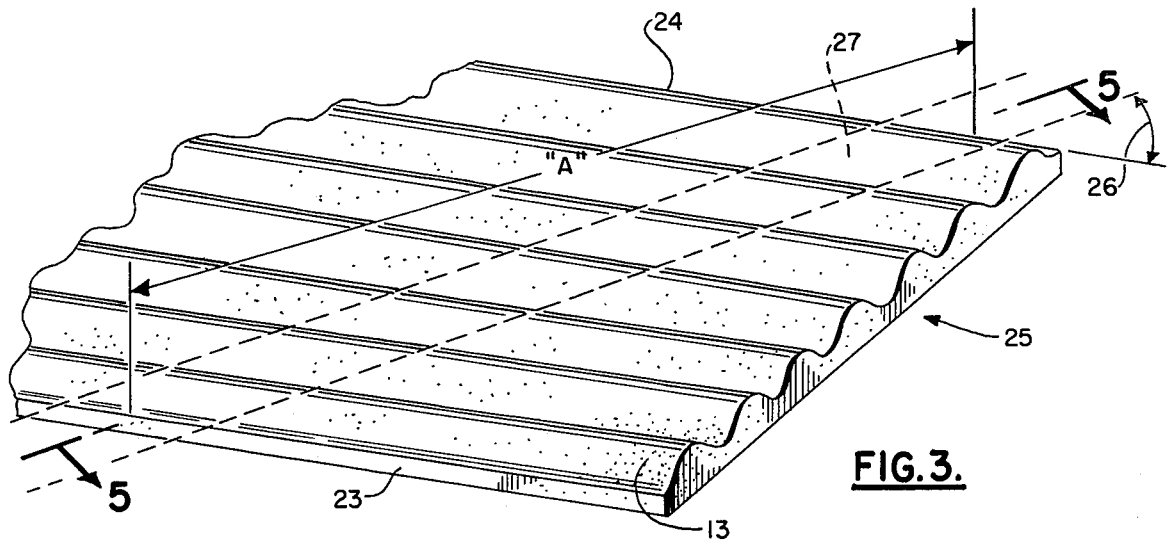
FIG. 3.
FIG. 5.
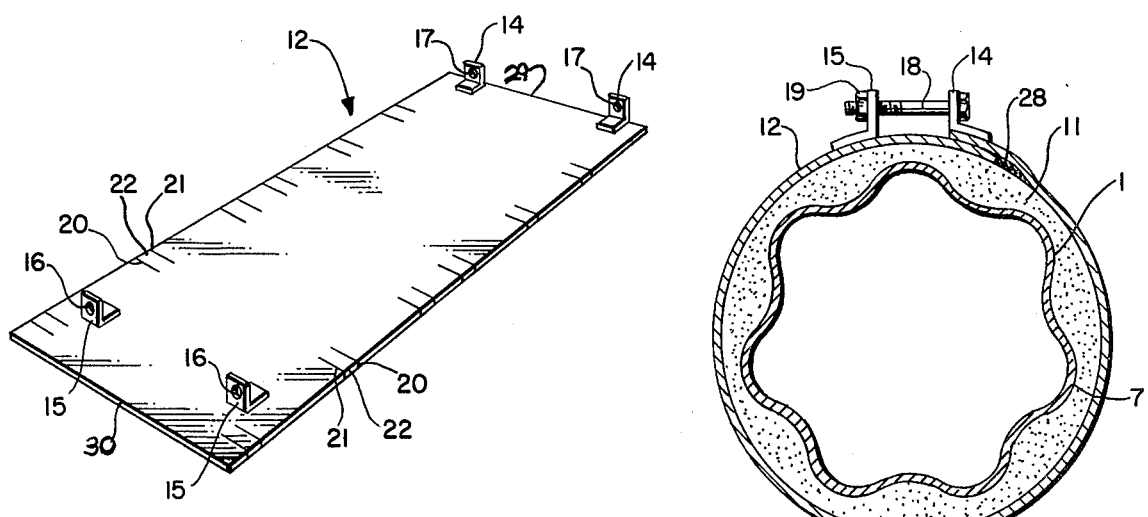
FIG. 4.
FIG. 6.

COUPLING FOR HELICALLY CORRUGATED SPIRAL PIPE

BACKGROUND OF THE INVENTION

1. Field of the Invention

This invention relates broadly to couplings and more specifically to couplings for providing a substantially soil tight joint between abutting ends of helically corrugated spiral pipe.

2. Prior Art

In general, most applications of helically corrugated spiral pipe require that the pipe be soil tight and convey liquids, such as water, without gross leakage, as this would cause undue setting or erosion of the soil surrounding the pipe. Furthermore, the pipe joints must also provide sufficient strength to maintain the proper alignment of the joined pipe sections throughout the life of the pipe. In joining adjacent sections of helically corrugated, spiral pipe, the prior art has found that the corrugations of the pipe sections to be joined and the corrugations of band-type couplings must be of substantially the same pitch, size and depth. Good examples of this earlier art can be found in: Campbell, U.S. Pat. No. 3,239,254 issued Mar. 8, 1966 and entitled "Pipe Coupling" and Wiley, U.S. Pat. No. 3,298,721 issued Jan. 17, 1967 and entitled "Coupling Band for Joining Corrugated Pipes". However, the use of these coupling devices required that the corrugations of the abutting pipes be aligned so that the band can properly seat on the pipe section ends. This generally requires rotation of one pipe which is very time consuming and not practical particularly in large diameter pipes. This and other problems, as more completely discussed in Boynton et al. U.S. Pat. No. 3,501,179 issued Mar. 17, 1970, and entitled "Helically Corrugated Spiral Pipe and Coupling Therefor", have led to attempts to rectify these problems. One of the earlier attempts and one most closely related to this invention is disclosed in Davis U.S. Pat. No. 3,315,991 issued Apr. 25, 1967 and entitled "Pipe Coupling" and is also discussed in the aforementioned Boynton et al. U.S. Pat. No. 3,501,179. In this disclosure, a pair of narrow, deformable elongated strips having a broad base are strapped to each pipe by a special metal band which upon tightening deforms the strips to match the pipe corrugations. The difficulty in such a design is the ability of the deformed narrow strips to form and maintain the necessary seal particularly in pipes having corrugations with great depth, and in cases where settling of the pipes is likely to occur. For this reason, the most commonly used corrugated pipe, particularly where proper seals are necessary is reformed pipe wherein the helical corrugations at the pipe ends have been reworked into annular corrugations. This pipe design is much easier to seal with various couplings such as that shown in the aforementioned Boynton et al. U.S. Pat. No. 3,501,179. The effectiveness of this arrangement, as attested by its wide industry usage, however, relies on a re-worked pipe whose costs is substantially higher than the helically corrugated spiral pipe. Therefore, if a coupling providing adequate sealing and which could be used on the helically corrugated spiral pipe is available substantial time, equipment and money savings could be realized.

SUMMARY OF THE INVENTION

Therefore, it is an object of this invention to provide a coupling for forming a substantially soil tight joint between abutting ends of helically corrugated, spiral pipe.

Another object of this invention is to provide a process for manufacturing flexible helically corrugated pre-formed strips for use in a coupling between abutting ends of helically, corrugated spiral pipe.

Other objects and advantages of this invention shall become apparent from the ensuing descriptions of the invention.

Accordingly, a coupling for forming a substantially soil tight joint between abutting ends of helically corrugated, spiral pipe is provided comprising a pair of flexible pre-formed strips having helical corrugations on one side which corrugations are of a similar pitch and depth as the pipe's corrugations, each strip fitting about one of the pipe's outer circumference near its abutting end with the strip's helical corrugations and mating with the pipe's corrugations.

In another embodiment of this invention a process for manufacturing a flexible, helically corrugated strip is provided by forming a band of flexible parallel corrugations (such as by conventional extrusion or injection molding techniques) and cutting the sheet across its corrugations at an angle corresponding to the angle formed by the helical pipes ridges to the pipe's axis.

BRIEF DESCRIPTION OF THE DRAWINGS

FIG. 3 is a perspective view of one embodiment of a sheet of parallel ridged material that can be used when cut where illustrated to form the strips usable in the coupling of this invention.

FIG. 4 is a perspective view of a preferred embodiment of the metallic tightening band having irregularly positioned notched tabs for preventing lateral movement of the abutting pipes.

FIG. 5 is a cross-sectional view taken along lines 5 — 5 of FIG. 3.

FIG. 6 is a cross-sectional view taken along lines 6 — 6 of FIG. 1.

PREFERRED EMBODIMENTS OF THE INVENTION

Figure 1:
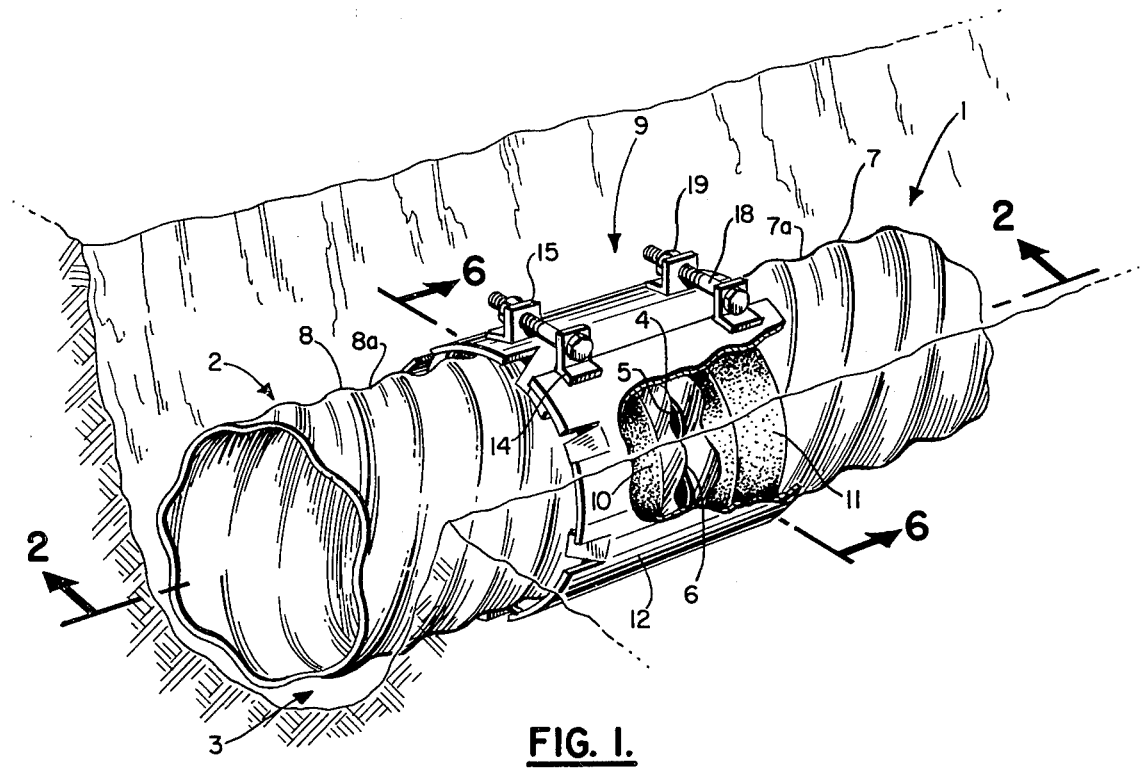
FIG. 1 is a cutaway perspective view of one embodiment of this invention illustrating the positioning of the coupling about abutting helically corrugated, spiral pipes.
Figure 2:
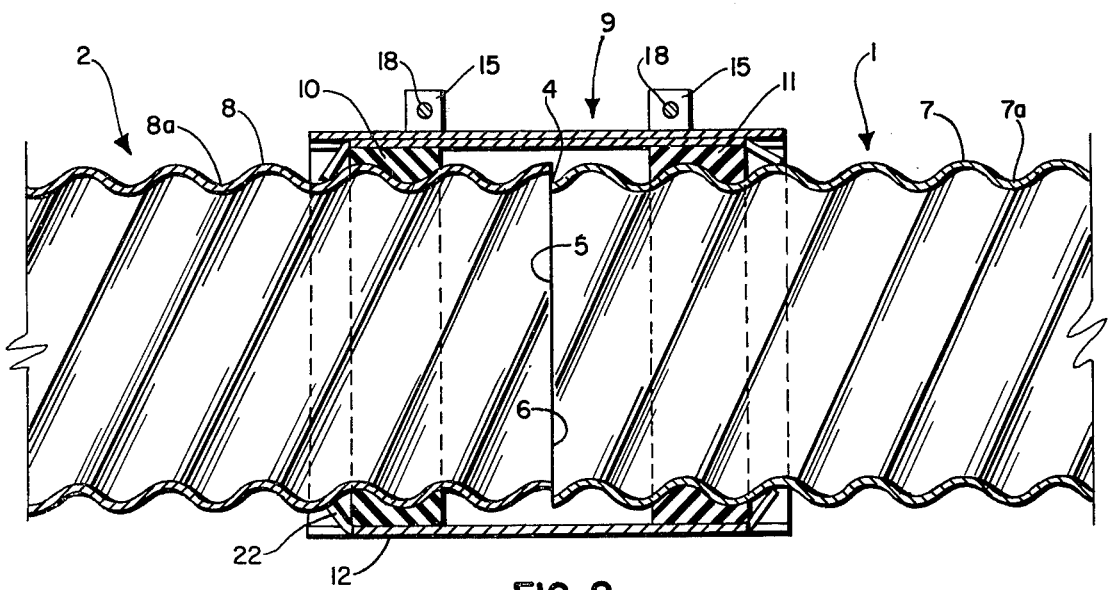
FIG. 2 is a cross-sectional view taken along lines 2 — 2 of FIG. 1.

In a typical use, two helically corrugated, spiral pipes 1 and 2 are placed in a trench 3 in an abutting arrangement as shown in FIG. 1. In many cases, a small gap 4 might be found between the abutting pipe ends 5 and 6 of pipes 1 and 2, respectively. Generally, the smaller the pipe 1 and 2 the less gap 4 which exists. As a practical matter, the corrugations 7 and 8 of pipe 1 and 2, respectively, will not match exactly at the abutting ends 5 and 6 unless time consuming adjustments are made. In accordance with this invention these adjustments are not necessary, but could be made if desired. In order to provide a substantially soil tight joint between the pipes 1 and 2, coupling 9 is secured in position as explained below.

Coupling 9 consists of two flexible, pre-formed strips 10 and 11 and a tightening band 12. Each strip 10 and 11 has corrugations 13 of similar pitch and depth as that of the pipe 1 or 2 which it fits around. In this manner corrugations 13, when placed about pipes 1 and 2 will mate with pipe corrugation 7 and 8. It is preferred that strips 10 and 11 be constructed from material which is slightly deformable so that when band 12 is tightened, strips 10 and 11 will properly mate with pipe corrugations 7 and 8. By utilizing this particular shape for strips 10 and 11, a more uniform compression with less pressure is required, thus insuring a tighter seal being formed. Also because substantially less compression is necessary a broader range of materials can be used for forming strips 10 and 11 which have great corrosion and wear characteristics. Suitable material for constructing strips 10 and 11 would preferably include various soft rubber materials presently in the marketplace which are slightly compressible.

Band 12, preferably metallic, for providing the desired rigidness, is a rectangular band as shown in FIG. 4 and is provided with conventional clamping shoulder sections 14 and 15 with openings 16 and 17, respectively, through which bolt 18 passes and is tightened by nut 19 (See FIG. 1). Band 12 should be wide enough to fit over both strips 10 and 11. Also, it is preferred that one of the shoulder sections 14 or 15 (shown as 15 in FIG. 4) be set back from edge 30 of band 12 so that when positioned about strips 10 and 11 band edges 29 and 30 overlap one another as shown more clearly in FIG. 6. In this embodiment, it is preferred that a sealant 28 be placed between the overlapping edges 29 and 30 to ensure a proper seal at this position as is well known in the art.

In a preferred embodiment band 12 is provided with pairs of parallel slits 20, 21 which create tongue areas 22 in band 12. After band 12 is wrapped around strips 10 and 11, these tongue areas can be depressed into pipe valleys 7a or 8a. This reduces and helps eliminate any lateral movement of pipes 1 and 2 due to settling of the soil in trench 3. In a more preferred embodiment slits 20, 21 will be irregularly spaced apart so that band 12 can be universal and used for all different sized pipes.

The coupling 9 can be assembled about pipes 1 and 2, either before or after they have been laid in trench 3.

In another embodiment of this invention a process for manufacturing strips 10 and 11 is provided. A sheet 25 of suitable material having parallel corrugations 13 of the same pitch and depth is formed by conventional extrusion or molding techniques. These corrugations 13 are parallel to edges 23 and 24 of sheet 25 and have a similar pitch and depth as are the corrugations 7 and 8 of pipe 1 and 2. Next, this sheet 25 is cut between edges 23 and 24 as shown by the dotted lines in FIG. 3. The angle 26 of the cut is preferably the helix angle of the pipe 1 and 2. It is preferred that the width of sheet 25 be substantially identical to the perpendicular distance between the seams of pipes 1 or 2 when the metal sheet forming the pipe is unrolled. Hence, the length of "A" of the cut sheet will equal the circumference of pipes 1 and 2.

There are, of course, many other alternates and embodiments of the invention not specifically mentioned, such as the use of this invention with arch pipe and no intention to exclude these from the scope of the invention is meant, as the scope of the invention should be limited only by the following claims.

What I claim is:

1. A coupling for providing a substantially soil tight joint between abutting ends of helically corrugated, spiral pipe which comprises:
   (a) a pair of flexible, pre-formed strips, each strip having a top and bottom surface, said bottom surfaces having helical corrugations which are of a similar pitch and depth as said pipe's corrugations, each strip being circumferentially continuous, each strip fitting about one of said pipe's outer circumference near its abutting end with said strip's helical corrugations and mating with said pipe's corrugations, and
   (b) a tightening band having a width sufficient to fit over both of said strips positioned on said pipes and having clamping means to clamp said strips in radial compression between said band and said pipes, said band having a bottom band surface in contact only with said top strip surface, said bottom band surface being substantially flat in those areas in contact with said top strip surface, said band, strips and clamping means being all so constructed and arranged that said strips are free to expand in an axial direction anywhere between their said top and bottom surfaces when said strips are radially compressed into engagement with said pipes and inner band surface by said clamping means.

2. A coupling according to claim 1 wherein said band has parallel edges provided with multiple pairs of slits.

3. A coupling according to claim 2 wherein said pairs of slits are spaced apart at irregular distances.

* * * * *